E. BARTHOLOMEW.
APPARATUS FOR OBTAINING PEAT.
APPLICATION FILED DEC. 22, 1913.
1,156,387.
Patented Oct. 12, 1915.
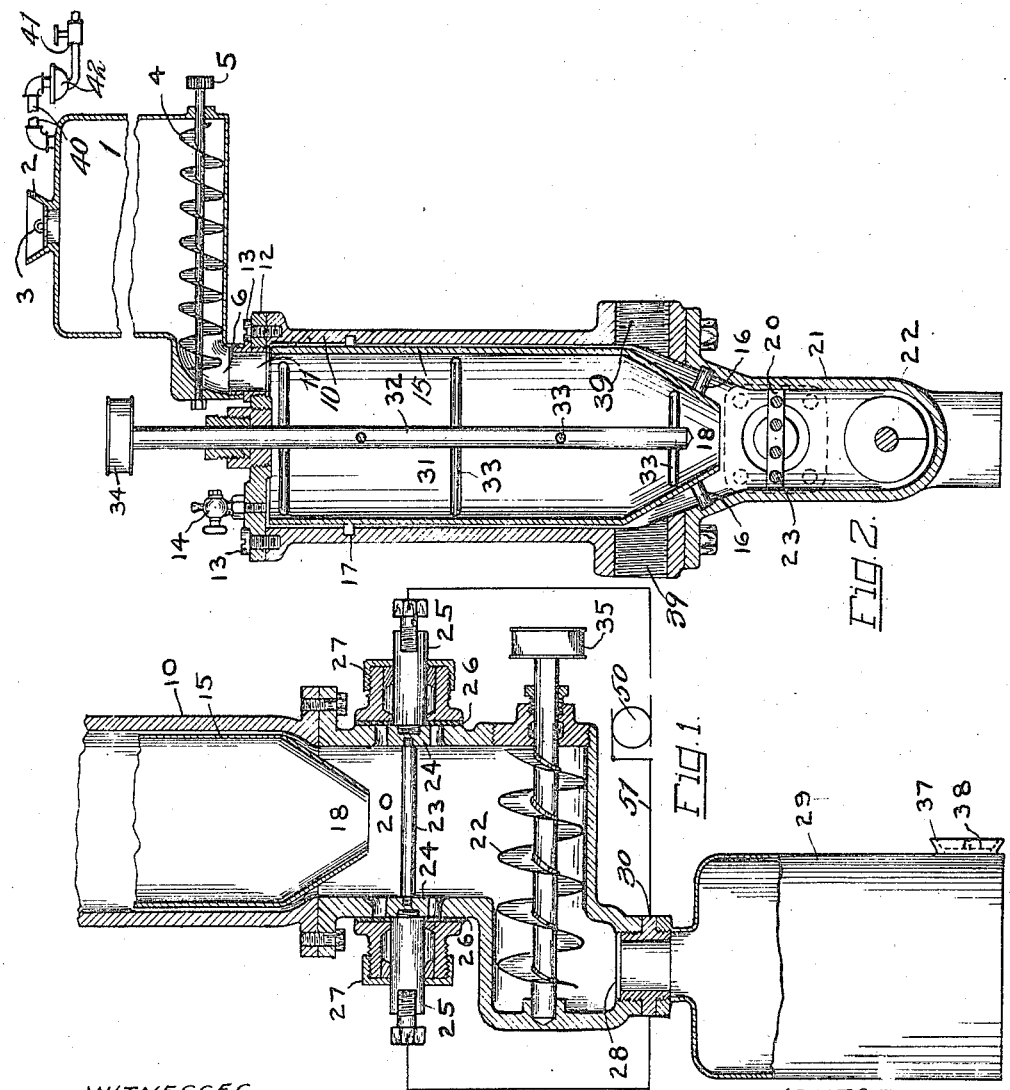

UNITED STATES PATENT OFFICE.

ELLIS BARTHOLOMEW, OF TOLEDO, OHIO, ASSIGNOR TO THE NATIONAL PEAT REFINING COMPANY, OF CLEVELAND, OHIO, A CORPORATION OF DELAWARE.

APPARATUS FOR OBTAINING PEAT.

1,156,387.          Specification of Letters Patent.      Patented Oct. 12, 1915.

Application filed December 22, 1913. Serial No. 808,213.

*To all whom it may concern:*

Be it known that I, ELLIS BARTHOLOMEW, a citizen of the United States, and a resident of Toledo, in the county of Lucas and State of Ohio, have invented a certain new and useful Apparatus for Obtaining Peat; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to apparatus for extracting the commercial products contained in peat.

It consists in providing a means for forming coke from peat and collecting the gases, oils and the volatile ingredients contained in the peat.

The apparatus usable in the conduct of the process may be of different forms and still such modifications will contain my invention; also the use of my invention may be involved in the conduct of many processes.

In order to show that the invention is practical, I have selected an apparatus, as an illustration of apparatuses containing my invention and shall describe it hereinafter. The apparatus selected is illustrated in the drawings, in which,—

Figure 1 is a vertical sectional view of a separator. Fig. 2 is a sectional view of the separator shown in Fig. 1, taken at right angles to the view shown in Fig. 1.

Referring to Figs. 1 and 2, 1 is a large container or bin, suitably supported, for containing peat. The peat is placed in the container or bin 1 through the hopper 2 located in the top of the bin. The opening in the hopper 2 is sealed by means of a plate 3. The bin 1 is provided with a screw conveyer 4, which is operated by means of a cog-wheel 5 or belt-wheel, which is driven by a suitable power mechanism. The bin 1 is provided with a mouth 6 through which the peat may be conveyed.

The bin is connected to the separator 10 by means of a coupler 11 having right and left handed threads. The coupler 11 is screwed in the mouth 6 of the bin and the top 12 of the separator 10. The top 12 is secured to the body of the separator 10 by means of screws or bolts 13. The top 12 is provided with a petcock 14 to allow escape of gases or air, as may be desired. An inner cylindrical shell 15 is located within the separator 10 and is supported by means of pins 16 and 17 in spaced relation with respect to the wall of the separator 10. This permits hot gases to rise around the shell and raise the temperature of its contents. The lower end 18 of the shell 15 is hopper-shape and directs the peat upon an electric heater 20. It is located near the rods and below the openings 39. The hopper shape forms a chamber for collecting the gases which keep the connected chambers filled and the surplus of which is directed out through the openings 39. The mouth of the hopper being located near the grate and the openings 39 being located above the mouth of the hopper and near the upper part of the hopper, the gases and vapors readily pass out through the openings 39 as they are formed or liberated by the heat of the grate.

The lower end 21 of the separator 10 is contracted and contains the heater 20 and a screw conveyer 22. The heater 20 consists of a plurality of bars 23 forming a grating below the hopper 18. The rods 23 receive the peat from the shell 15. They are supported on conductors 24, which are connected to electric connectors 25. The connectors 25 are insulated from the body of the separator 10 by means of fiber plates 26. They are sealed in the separator 10 by means of the packing boxes 27.

The screw conveyer 22 is located below the bars 23 and as the peat is turned into coke by the intense heat of the rods 23, the coke falls to the conveyer 22. The lower end of the separator 10 is provided with a mouth 28. The coke is conveyed by the screw conveyer 22 to the mouth 28 through which it falls into a receptacle or bin 29. The separator 10 is connected with the bin 29 by means of a coupler 30 for right and left handed threads. The conveyer may be operated by means of the pulley 35 or by any other suitable means. A stirrer 31 may be provided for preventing the peat from packing in the shell 15 and for working the coke off the rods 23. The stirrer has a shaft 32 to which are secured cross-rods 33. The shaft 32 extends down to near the end of the hopper 18 of the shell 15. The stirrer 31 may be operated by a pulley 34 or by any other suitable mechanism.

The rods 23 through the connectors 25 are connected to a source of current of large amperage, and they are heated to a very high temperature. As the peat falls upon the rods the gases and liquids are heated and rise and pass up around the outside of the shell 15. The coke, which is formed by the heat produced by the rods 23, falls to the bottom of the separator 10 and is conveyed to the container 29, the shaker 33 constantly working the peat down to the heater 23 and causing it to knock and work off the coke. The coke may be removed from the bin 29 through the sealed door 37 and 38 located at the bottom of the bin. The plate 37 sets into a flaring flange 38 surrounding the opening; this tightly closes the opening.

The gases and heavy vapors separated from the peat and driven off by the heat, pass through one or more outlets 39 arranged around the hopper and below the lower or delivery end thereof. The outer surface of the hopper directs the gases and vapors to the outlets 39. They are directed into a suitable collector wherein the heavy liquids such as tar are collected and are immediately condensed and fall to the bottom of the collector. The gases and the vapors of the lighter liquids pass on and are separated, purified and collected in suitable apparatus and reservoirs.

In order to obtain a suitable balancing pressure in the system of which the separator forms a part and in order to fill the system with a gas similar in character to that produced by the heater 23 in the separator 10 and to drive all air out of the system, a reservoir for one of the gases collected is connected to the bin 1 by means of a pipe 40 which is provided with a valve 41 and a clap-valve 42. The clap-valve 42 prevents automatically any return of the gas to the reservoir from the bin 1.

The heater 23, is connected to a source 50 of current by means of the conductors 51. Any suitable arrangement may be made for connecting the heaters with a source of current. They may be connected to a step-down line transformer wound for producing large amperage. The conductor 51 may also contain suitable switches and electrically controlled and protective devices, what I have shown being merely a conventional illustration of a means for directing an electric current through the heater 23.

The apparatus selected and described may be greatly varied in the arrangements and order of their parts and in the substitution of elements having equivalent functions without departing from the spirit of the invention.

Having thus described my invention, what I claim as new, and desire to secure by Letters Patent, is,—

1. In a separator, the combination of an outer and an inner shell having a hopper at its lower end the two shells being located in spaced relation, a stirrer contained in the shell, a grate heater located beneath the lower end of the shell, the separator having outlets located around and above the delivery end of the hopper, the space between the shells of the separator adapted to be filled with the gas arising around the hopper.

2. In a separator, the combination of an inner and outer shell, the lower end of the inner shell forming a hopper and a grate of electrodes located below and near the hopper to form a clear annular space for collecting the gases, the outer shell having an outlet for gases and vapors located beside the hopper above the grate.

3. In an apparatus for separating peat products, the combination of two bins and a separator hermetically sealed, the separator connected between the bins, a conveyer for conveying the contents of one bin to the separator, the separator having a hopper and a stirrer, a grate of electrodes for receiving the contents of the separator through the hopper, a conveyer for directing the material from the grate to the second bin, means for directing some of the gas formed at the grate, through the separator and to the bin from which material is received by the separator.

4. In an apparatus for separating peat products, the combination of two bins and a separator hermetically sealed, the separator connected between the bins, a conveyer for conveying the contents of one bin to the separator, the separator having an inner shell, the shell having a hopper at its lower end and a stirrer, a grate of electrodes for receiving the material from the separator through the hopper, located close to the hopper, and forming a clear annular space for collecting the gases formed at the grate, the outer wall of the separator having outlets located above the lower edge of the hopper, a conveyer for directing the material from the separator to the second bin.

In testimony whereof, I have hereunto signed my name to this specification in the presence of two subscribing witnesses.

ELLIS BARTHOLOMEW.

Witnesses:
S. T. KLOTZ,
F. E. AUL.